US008503458B1

(12) United States Patent
Modi et al.

(10) Patent No.: US 8,503,458 B1
(45) Date of Patent: Aug. 6, 2013

(54) METHODS AND APPARATUS FOR CHARACTERIZING ADAPTIVE CLOCKING DOMAINS IN MULTI-DOMAIN NETWORKS

(75) Inventors: Nirav J. Modi, Elmhurst, IL (US);
Robert E. Bland, Schaumburg, IL (US);
Christopher V. O'Brien, North Aurora, IL (US)

(73) Assignee: Tellabs Operations, Inc., Naperville, IL (US)

( * ) Notice: Subject to any disclaimer, the term of this patent is extended or adjusted under 35 U.S.C. 154(b) by 1086 days.

(21) Appl. No.: 12/432,056

(22) Filed: Apr. 29, 2009

(51) Int. Cl.
*H04L 12/28* (2006.01)

(52) U.S. Cl.
USPC .................................... 370/395.53

(58) Field of Classification Search
None
See application file for complete search history.

(56) References Cited

U.S. PATENT DOCUMENTS

| | | | |
|---|---|---|---|
| 5,329,471 A * | 7/1994 | Swoboda et al. ............... 703/23 |
| 6,157,646 A * | 12/2000 | Nichols ..................... 370/395.62 |
| 6,363,073 B2 * | 3/2002 | Nichols ..................... 370/395.62 |
| 6,366,959 B1 * | 4/2002 | Sidhu et al. .................... 709/231 |
| 6,434,606 B1 * | 8/2002 | Borella et al. ................. 709/214 |
| 6,738,916 B1 * | 5/2004 | Gladden et al. ............... 713/400 |
| 7,103,129 B2 * | 9/2006 | Neumann et al. .............. 375/372 |
| 7,170,856 B1 * | 1/2007 | Ho et al. ........................ 370/230 |
| 7,210,082 B1 * | 4/2007 | Abdel-Hafez et al. ........ 714/726 |
| 7,463,598 B1 * | 12/2008 | Ng et al. ......................... 370/260 |
| 7,613,212 B1 * | 11/2009 | Raz et al. ........................ 370/510 |
| 7,707,021 B2 * | 4/2010 | Cha et al. ........................ 703/23 |
| 7,817,545 B2 * | 10/2010 | Ho et al. ........................ 370/231 |
| 7,852,882 B2 * | 12/2010 | Jougit et al. ................... 370/516 |
| 7,924,885 B2 * | 4/2011 | De-Leon et al. .............. 370/503 |
| 7,929,574 B2 * | 4/2011 | Harrison et al. .............. 370/503 |
| 7,966,510 B2 * | 6/2011 | Harrison et al. .............. 713/500 |
| 2001/0000071 A1 * | 3/2001 | Nichols .......................... 370/395 |
| 2002/0126707 A1 * | 9/2002 | Tong et al. ..................... 370/516 |
| 2002/0173338 A1 * | 11/2002 | Neumann et al. ............. 455/552 |
| 2003/0063625 A1 * | 4/2003 | Belk et al. ...................... 370/503 |
| 2003/0112908 A1 * | 6/2003 | Mar ................................ 375/355 |
| 2003/0185212 A1 * | 10/2003 | Kelly et al. ................. 370/395.1 |
| 2004/0042474 A1 * | 3/2004 | Walker et al. .................. 370/412 |
| 2004/0193957 A1 * | 9/2004 | Swoboda et al. ............... 714/30 |
| 2004/0223570 A1 * | 11/2004 | Adkisson ....................... 375/359 |
| 2004/0223577 A1 * | 11/2004 | Watanabe et al. ............. 375/376 |
| 2004/0240478 A1 * | 12/2004 | Goren et al. ................... 370/503 |
| 2005/0100006 A1 * | 5/2005 | Scott et al. ..................... 370/360 |
| 2007/0019547 A1 * | 1/2007 | Ho et al. ........................ 370/230 |
| 2007/0019686 A1 * | 1/2007 | Belk et al. ...................... 370/516 |
| 2007/0041324 A1 * | 2/2007 | Shenoi ........................... 370/235 |
| 2007/0189164 A1 * | 8/2007 | Smith et al. .................... 370/230 |
| 2007/0265823 A1 * | 11/2007 | Cha et al. ......................... 703/24 |
| 2007/0288184 A1 * | 12/2007 | Konishi et al. .................. 702/79 |
| 2008/0159384 A1 * | 7/2008 | Civanlar et al. .......... 375/240.01 |
| 2008/0186999 A1 * | 8/2008 | De-Leon et al. .............. 370/465 |
| 2008/0310447 A1 * | 12/2008 | Bedrosian ...................... 370/468 |
| 2009/0141743 A1 * | 6/2009 | Harrison et al. .............. 370/503 |
| 2009/0142062 A1 * | 6/2009 | Harrison et al. ................ 398/98 |

(Continued)

*Primary Examiner* — Otis L Thompson, Jr.
(74) *Attorney, Agent, or Firm* — James M. Wu; JW Law Group

(57) ABSTRACT

An apparatus and method for managing and characterizing clock domains in multi-domain networks are disclosed. A process of clock domain management is capable of receiving a data packet or data stream traveling across CES circuit. Upon obtaining a clock domain hierarchy stored in a storage location, the process identifies a clock frequency in the clock domain hierarchy in accordance with the CES circuit. The clock domain hierarchy, in one embodiment, is a searchable database containing information relating to clock domains. The clock frequency is subsequently assigned to a packet processing unit for data processing.

20 Claims, 7 Drawing Sheets

(56) References Cited

U.S. PATENT DOCUMENTS

| | | | |
|---|---|---|---|
| 2009/0147806 A1* | 6/2009 | Brueckheimer | 370/503 |
| 2009/0190614 A1* | 7/2009 | Jougit et al. | 370/516 |
| 2009/0240969 A1* | 9/2009 | Chiu et al. | 713/401 |
| 2009/0274463 A1* | 11/2009 | Bernard et al. | 398/72 |
| 2010/0098433 A1* | 4/2010 | Boyd et al. | 398/155 |
| 2010/0135328 A1* | 6/2010 | Sasson et al. | 370/474 |
| 2010/0158181 A1* | 6/2010 | Hadzic | 375/371 |
| 2010/0265970 A1* | 10/2010 | Toscano | 370/522 |
| 2011/0044357 A1* | 2/2011 | Shtern et al. | 370/516 |
| 2011/0051957 A1* | 3/2011 | Jougit et al. | 381/94.1 |
| 2011/0191621 A1* | 8/2011 | Harrison et al. | 713/501 |
| 2011/0264436 A1* | 10/2011 | Ni et al. | 703/28 |

* cited by examiner

METHODS AND APPARATUS FOR CHARACTERIZING ADAPTIVE CLOCKING DOMAINS IN MULTI-DOMAIN NETWORKS

RELATED APPLICATION

This application is related to the following co-pending application assigned to the Assignee of the present invention.

a. application Ser. No. 12/432,023, filed Apr. 29, 2009, entitled "Methods and Apparatus for Clocking Domain Discovery in Multi-domain Networks," invented by Modi, et al.

FIELD

The exemplary embodiment(s) of the present invention relates to communications network. More specifically, the exemplary embodiment(s) of the present invention relates to clock domain management for network communications.

BACKGROUND

A high-speed network environment typically includes network devices such as routers and switches used for facilitating delivery of information packets and/or data traffic from source devices to destination devices via one or more communication networks. Information pertaining to the transfer of data packet(s) and/or frame(s) through the network(s) is usually embedded within the packet and/or frame itself. Each packet, for instance, traveling through multiple nodes via one or more communications networks such as Internet and/or Ethernet can typically be handled independently from other packets in a packet stream or traffic. Each node which may include routing, switching, and/or bridging engines processes incoming packets or frames, and determines where the packet(s) or frame(s) should be forwarded.

In a high-speed computing network environment, it is critical to maintain high speed traffic flows such as circuit emulation service ("CES") circuits with minimal data loss and/or packet drop when the data traffic crosses multiple communications networks or multi-domain networks. In equipment supporting circuit emulation services, a customer or network administrator can provision one or more different timing domains. Each timing domain typically contains a group of CES circuits that are based on the same reference clock. To ensure the reproduced CES circuit, on the far-side of the packet network, accurately represents the original CES circuit, it is critical that the circuit emulation service is assigned the correct timing domain.

A problem associated with a high-speed computing network is that each CES circuit, for instance, can be clocked at a different or unique reference clock. A conventional approach to obtain a recovered clock is manual operation wherein a network administrator manually assigns a clock domain to a circuit on a node.

SUMMARY

A method and apparatus for managing and/or characterizing clock domains in multi-domain networks is disclosed. A process of clock domain management is capable of receiving a data packet or data stream traveling across a packet network. Upon obtaining a clock domain hierarchy stored in a storage location, the process identifies a clock frequency in the clock domain hierarchy in accordance with the circuit emulation service ("CES") circuit. The clock domain hierarchy, in one embodiment, is a searchable database containing information relating to clock domains. The clock frequency is subsequently assigned to a packet processing unit for data processing.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
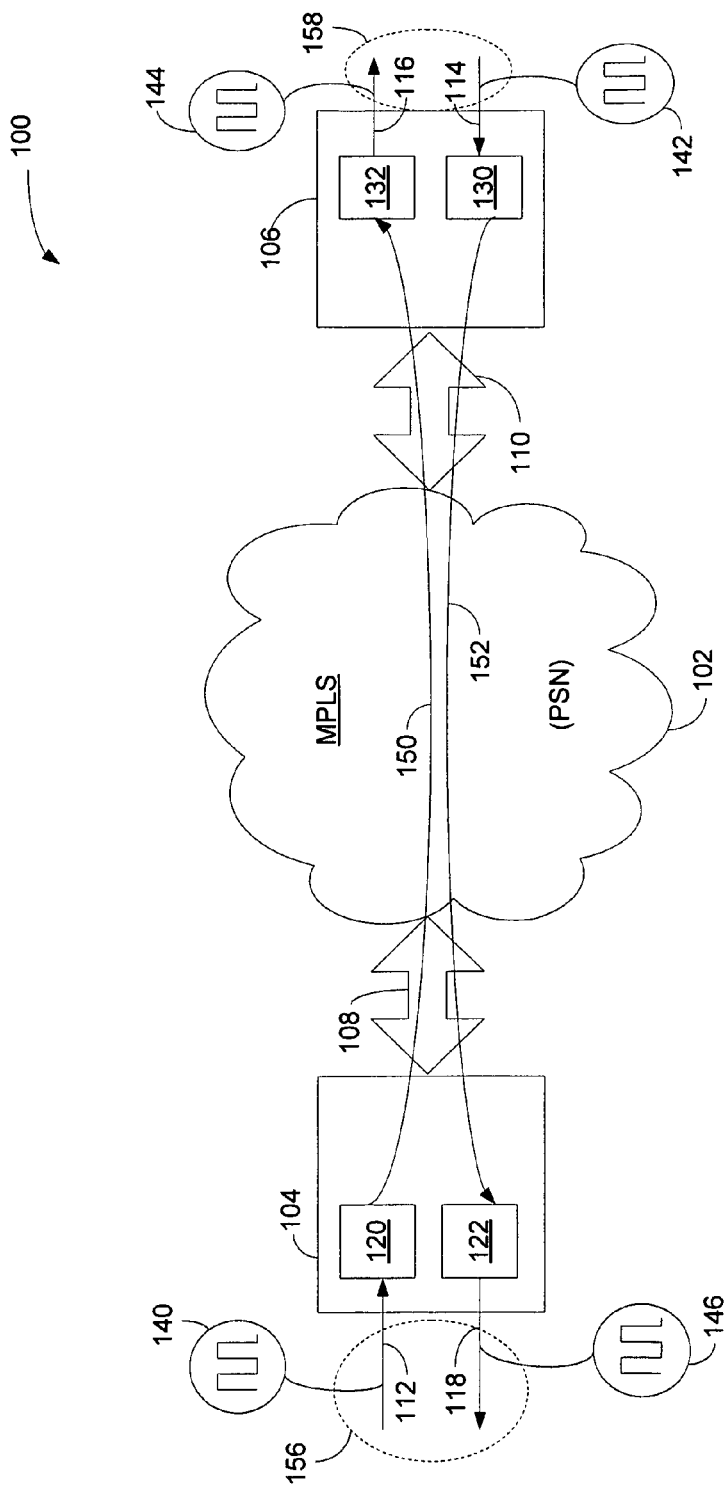
FIG. 1 is a block diagram illustrating a network configuration having a clock domain management(s) capable of recovering clock frequencies in accordance with one embodiment of the present invention.

Exemplary embodiment(s) of the present invention is described herein in the context of a method, device, and apparatus of enhancing network performance having a clock domain management using a clock domain hierarchy.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. It, however, will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure unless otherwise defined.

As used herein, the singular forms "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items An embodiment of the present invention discloses a clock domain management capable of managing and/or characterizing clock domains in multi-domain networks. A process of clock domain management is capable of receiving a data packet or data stream traveling the circuit emulation service ("CES") circuit. Upon obtaining a clock domain hierarchy stored in a storage location, the process identifies a clock frequency in the clock domain hierarchy in accordance with the CES circuit. The clock domain hierarchy, in one embodiment, is a searchable database containing information relating to clock domains. The clock frequency is subsequently assigned to a packet processing unit for data processing.

It should be noted that the term "clock domain" can also be referred to as "time domain," "timing domain," "clock frequency domain," "frequency," "time period," and the like. In addition, the term "data packets" can also be referenced as "data stream," "packet stream," "data frames," "information," "frames," et cetera. Moreover, connections may also include wires, wireless connections, cables, coax lines, telephone lines, Internet backbones, Ethernet connections, and so forth.

FIG. 1 is a block diagram 100 illustrating a network configuration having a clock domain management(s) capable of recovering clock frequencies in accordance with one embodiment of the present invention. Diagram 100, in one embodiment, includes a MPLS network or cloud 102, two nodes 104-106, and two regional networks 156-158 such as CES based networks. Ethernet interfaces 108-110, in one example, are used to bridge and/or transfer data packets and/or frames between nodes 104 and 106 via MPLS 102. It should be noted that the underlying concept of the exemplary embodiment(s) of the present invention would not change if one or more blocks (or elements or connections) were added to or removed from diagram 100.

MPLS 102, in one aspect, is situated between Data Link Layer and Network Layer and is a global based communications network used to provide data transfer between circuit-based systems (or clients) and packet-based systems (or clients). MPLS 102, for example, is able to handle various types of data format, such as IP, ATM, SONET, TDM, and/or Ethernet data streams. Note that the concept of embodiment(s) of the network configuration would not alter if MPLS 102 is replaced with another types of global communications network(s), such as Wide Area Network(s) ("WAN"), Internet, Metro Ethernet Network ("MEN"), Metropolitan Area Network ("MAN"), and the like.

A CES circuit network can be a regional and/or private network system since CES links are used to dedicate CES services to a group of known customers. CES networks 156-158 are circuit-based switching networks, usually based on SONET/PDH/SDH technologies. Frame-based CES networking technologies are capable of transmitting multiple signals simultaneously over a single transmission path using, for instance, an interleaving time-slot mechanism. The interleaving timing-slot mechanism, for example, packs multiple data streams with each stream having a speed of 64 kilo bits per second ("Kbps") into T1 channel with a capacity of 1.544 Mbps. It should be note that CES networks 156-158 may include other networks, such as MEN, MAN, WAN, and/or a combination of MEN, MAN, LAN, and/or WAN.

To transport CES data packets/frames through packet switched network ("PSN") such as Internet or MPLS, Circuit Emulation Service ("CES") is used to facilitate CES services. For example, CES provides TDM services to customers (or providers) by emulating TDM circuits over a PSN. TDM services include Plesiochronous Digital Hierarchy ("PDH"), Synchronous Optical Network ("SONET"), and/or Synchronous Digital Hierarchy ("SDH") services. PDH includes T1 and E1 lines while SONET/SDH includes STS-1, STS-3, et cetera.

A CES circuit, for example, is a point-to-point link and facilitates a data flow between a circuit-switching network and a packet-switching network. To transfer multiple bit streams simultaneously over multiple sub-channels, a time domain, for example, is divided into multiple time slots wherein each time slot is designated to transport one bit stream. With implementation of Ethernet CES, CES technologies are migrating to the world of packet network(s).

Referring back to FIG. 1, node 104 is a network device capable of receiving data from a circuit 152 (or CES) and routing data onto a circuit 150. Node 104 can be a router, a switch, a bridge, or a combination of router, switch, and/or bridge. Node 104, in one embodiment, includes an egress element 122 and an ingress element 120 wherein elements 120-122 are coupled to CES network 156 and MPLS 102. Ingress element 120 is capable of receiving CES data stream or frames having a reference clock 140 over connection 112. Reference clock 140 provides a clock frequency used to clock data onto a bus or connection 112. After receipt of CES data stream, ingress element 120 (CES→PSN IWF) forwards or routes received data stream(s) to its destination via a CES 150 traveling through MPLS 102. Egress element 122, on the other hand, receives CES data stream or packets via a CES 152 through a PSN or MPLS 102. Egress element 122, in one embodiment, includes a clock domain management capable of characterizing and/or recovering reference clock from a data stream received. The data stream is subsequently forwarded by egress element 122 to its destination using recovered clock frequency 146 via connection 118. It should be noted that node 104 may include additional ingress and/or egress element(s).

Similarly, node 106 is a network device capable of receiving data from a circuit 150 (or CES) and routing data onto a circuit 152. As node 104, node 106 can be a router, a switch, a bridge, or a combination of router, switch, and/or bridge. Node 106 includes an egress element 132 and an ingress element 130 wherein elements 130-132 are coupled to CES network 158 and MPLS 102. Ingress element 130, in one embodiment, receives CES data stream or data frames having a reference clock 142 via connection 114. Reference clock 142 provides a clock frequency used to clock data onto a bus or connection 114. After receipt of CES data stream, ingress element 130 performs CES→PSN IWF and forwards the data stream to its destination via a CES 152 across MPLS 102. Egress element 132, on the other hand, receives the CES data stream via a CES 152 across MPLS 102. Egress element 132, in one embodiment, includes a clock domain management capable of characterizing and/or recovering reference clock from the received data stream. The data stream is forwarded by egress element 132 to its destination using recovered clock frequency 144 over connection 116. It should be noted that node 106 can include additional ingress and/or egress element(s).

Egress element 122 or 132 includes a Packet Switched Network ("PSN") to CES interworking function including adaptive clock recovery feature(s). The PSN-to-CES interworking function, in one embodiment, includes a clock domain management capable of selecting or recovering a clock frequency used to clock data stream onto a bus or connection 118. The clock domain management uses usage rate of a traffic buffer such as a jitter buffer to recover the reference clock. The clock domain management, in one embodiment, provides a frequency of a recovered reference clock that is the same or substantially the same as the frequency of the original reference clock. Ingress element 120 or 130, on the other hand, includes CES to PSN interworking function(s) capable of receiving data frames over bus 112 or 114 clocked by reference clock frequency 140 or 142, respectively.

For a CES with in the PSN-to-CES direction, node 104 or 106 generates a clock frequency to facilitate a speed of CES signals such as DS1 signals. Egress element 122 or 132, in one embodiment, is capable of determining an optimum reference clock in accordance with a traffic buffer such as a jitter buffer. Note that while ingress elements receive data streams clocked by one or more reference clocks, egress elements route received data streams to their destinations in accordance with recovered clock(s). For example, reference clock 140 indicates a speed of arriving data stream at ingress element 120 while reference clock 142 illustrates a speed of arriving data stream at ingress element 130. Reference clocks 140 and 142 can be the same or different clock frequencies. As such, recovered clock 146 used to clock out packet streams at egress element 122 can be the same or different from recovered clock frequency 144.

The clock domain management, in one embodiment, automatically selects a timing domain for a CES and subsequently monitors a traffic buffer(s) such as a jitter buffer associated with the CES. By monitoring jitter buffer depth (per circuit), the clock domain management can determine whether or not the currently assigned timing domain is optimum for the circuit. If, for example, a jitter buffer depth is not within an ideal performance range (i.e. ½ way mark), the circuit may be automatically reassigned to another timing domain. The clock domain management continues to monitor the jitter buffer after the reassignment of a new time domain. The reassignment process repeats until an optimum clock domain is identified. The optimum clock domain, for example, indicates that the data input rate is the same or almost the same as data output rate. In other words, the optimum clock domain means that the recovered clock frequency matches or almost matches with reference clock frequency.

The clock domain management, which can be a hardware component or a software component, is capable of keeping a record indicating which clock domain or domains have already been assigned for a particular CES. It should be noted that various available timing domains, in one embodiment, are predefined (or known) and there is at least one "optimum" or near "optimum" timing domain for each circuit. Note that adaptive clocking domain discovery enables CES service emulation in a multi clock domain network.

In one embodiment, one or more optimum clock domains for a CES are stored in a clock domain hierarchy. Clock domains stored in the hierarchy are addressed by CES wherein the hierarchy can provide optimum clock domain(s) for processing data stream from a CES which has been identified in the hierarchy. In operation, if a CES is used for the first time, an optimum clock domain(s) is identified and/or characterized. The optimum clock domain(s) associated with the CES is subsequently saved in a storage indexed by the CES for the future reference. When the CES is referenced for the second time (or subsequent times), the optimum clock domain associated with the CES is fetched from the hierarchy.

An advantage of using the present embodiment of clock domain management is to automatically identify and recover reference clock(s). The clock domain management, for example, facilitates automatic discovery as well as continuously adjusting clock domains for one or more CES whereby the overall OAM and provisioning operations are simplified.

Figure 2:
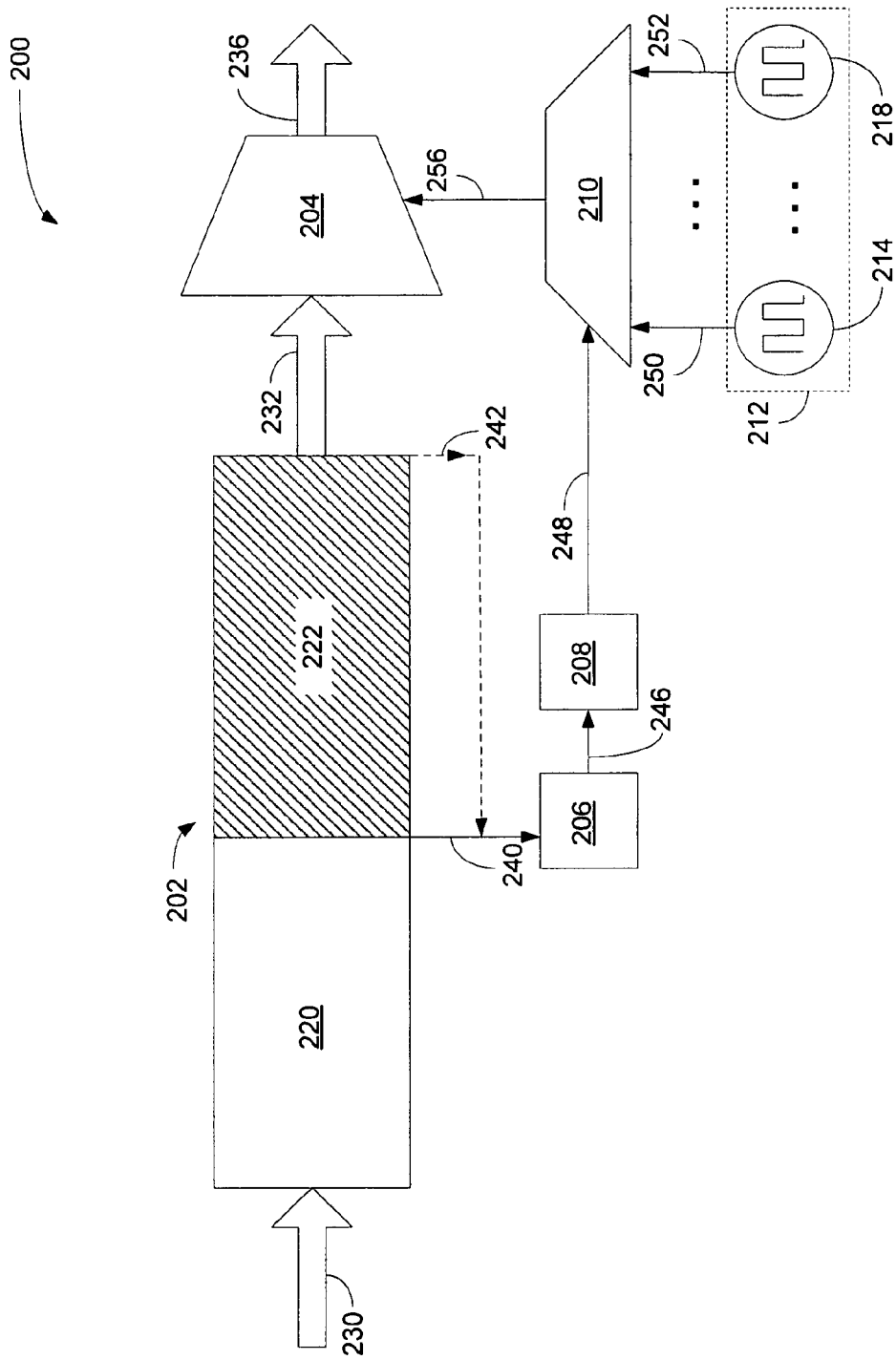
FIG. 2 is a logic block diagram illustrating a process of generating a clock frequency using a traffic buffer in accordance with one embodiment of the present invention.

FIG. 2 is a logic block diagram 200 illustrating a process of generating a clock frequency using a traffic buffer in accordance with one embodiment of the present invention. Diagram 200 includes a traffic buffer 202, a gating logic 204, a clock selector 210, and a set of clock pool 212, wherein clock pool 212 include multiple clock frequencies 214-218. Clock selector 210 is coupled with clock pool 212 via multiple clock connections 250-252. It should be noted that the underlying concept of the exemplary embodiment(s) of the present invention would not change if one or more blocks (or elements or connections) were added to or removed from diagram 200.

Traffic buffer 202, in one embodiment, is a memory device capable of storing and/or shifting data. A function of traffic buffer 202 is to remove data jittering occurred during network congestions, timing drifts, route changes, wrong sequences, and the like. Traffic buffer 202, in one embodiment, is a jitter buffer, which collects, stores, and sends data stream in evenly spaced time intervals. The terms "traffic buffer" and "jitter buffer" are used interchangeable hereinafter. A jitter buffer, which may be located at the receiving end of a network device, deliberately delays the arriving packets thereby the end user can receive data packets with less (or reduced) data distortion and/or jitters. The jitter buffer can be a hardware-based or software-based memory component and it may be configurable by a network administrator. Traffic buffer or jitter buffer 202, in one embodiment, is located in node 104 or 106 shown in FIG. 1.

Jitter buffer 202 receives data stream coming from a PSN over a bus 230 (also does PSN-CES interworking) and subsequently, forwards the received data stream (or data packets) to gating logic 204 via a bus 232. During a normal operation, jitter buffer 202 includes a full portion 222 and an empty portion 220 wherein full portion 222 indicates the amount of data packets stored in jitter buffer 202. Diagram 200 further includes a usage detector 206 and a clock domain controller 208, wherein usage detector 206 detects or senses the usage rate of jitter buffer using a beginning pointer 242 and a next pointer 240. Usage detector 206 is able to report a real-time usage of jitter buffer 202. For example, usage detector 206 can report that jitter buffer 202 operates in half (50%) full or hundred percent (100%) full. Upon receipt of a usage report generated by usage detector 206 via bus 246, clock domain controller 208 generates a clock selection signal. After selecting a clock domain or clock frequency from clock pool 212 in accordance with the clock selection signal from bus 248, clock selector 210 provides clock or recovered clock signals to gating logic 204 via bus 256. Gating logic 204 subsequently gates received data stream onto bus 236 in accordance with recovered clock signals provided by bus 256. It should be noted that clock selector 210, gating logic 204, usage detector 206, and/or clock domain controller 208 can be integrated onto one or several devices.

Usage detector 206, in one embodiment, is also capable of measuring slips which indicate incorrect timing domain(s). Slip, in one embodiment, indicates an under-run or over-run scenario of a jitter buffer. For example, if a clock rate is off significantly, the jitter buffer may experience an under-run scenario, which means that the jitter buffer is completely empty. On the other hand, if a clock rate is too slow, the jitter buffer may experience an overflow which means that the jitter buffer is completely full. When the jitter buffer is in an over-run scenario, packets may be dropped and consequently, the data is lost. Monitoring under-run and/or overflow conditions can detect or comprehend whether or not the correct timing domain has been assigned to a particular circuit. The clock domain management and jitter buffers, in one example, are resided in egress element 122 and/or 132 shown in FIG. 1.

Figure 3:
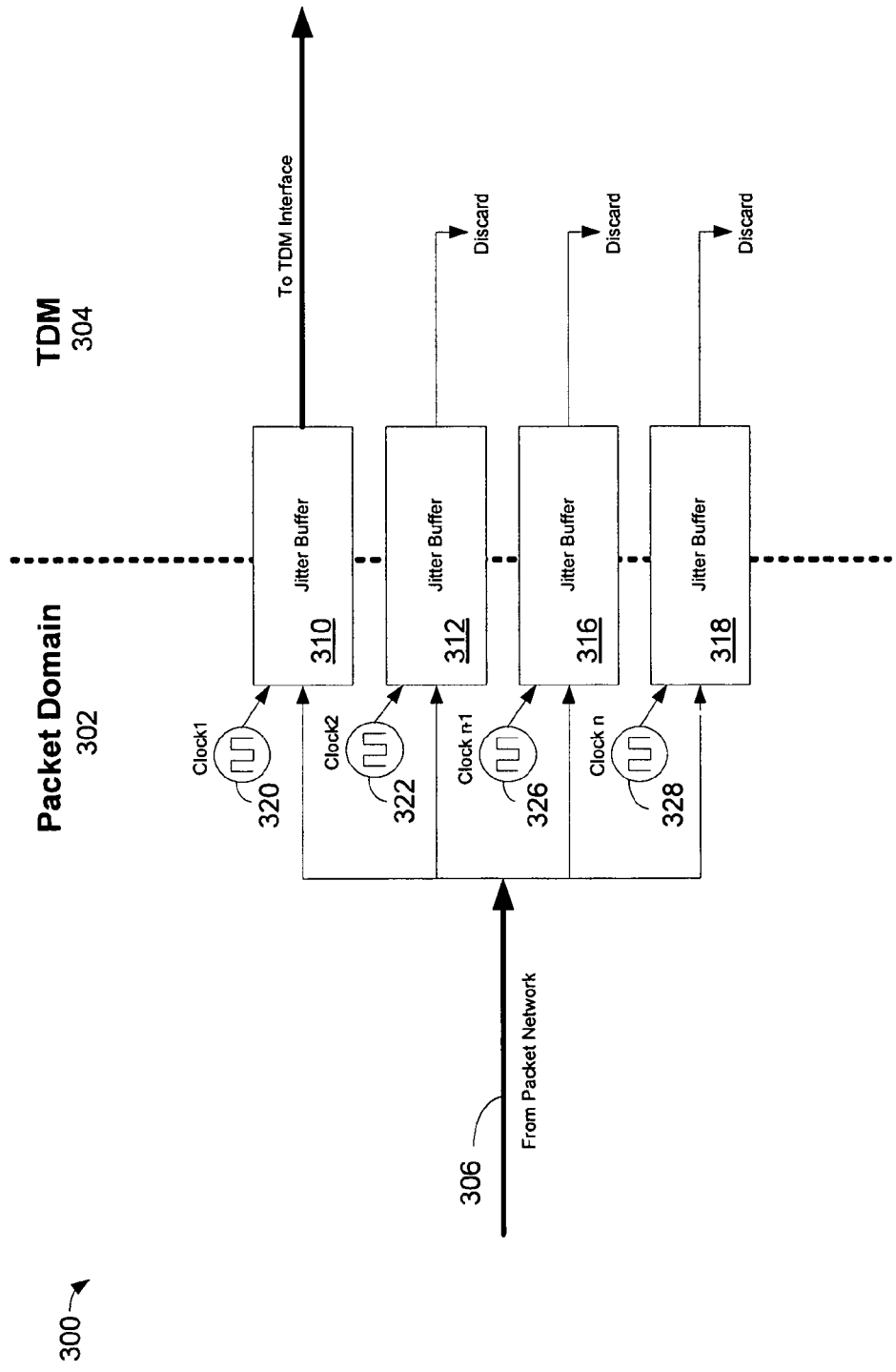
FIG. 3 is a logic block diagram illustrating a process of identifying a clock domain using multiple buffers in accordance with one embodiment of the present invention.

FIG. 3 is a logic block diagram 300 illustrating a process of identifying a clock domain using multiple buffers in accordance with one embodiment of the present invention. Diagram 300 shows a packet domain side 302, a CES side 304, a set of buffers 310-318, and a set of clock domains 320-328. In one embodiment, input data flow 306 is replicated into multiple inputs feeding into buffers 310-318 wherein each buffer is clocked or timed by a different clock domain. Each incoming packet stream is replicated once for each available clock domain. After replicating, the replicated packet stream can run through multiple clocking domains concurrently. All of buffers 310-318, which can be jitter buffers, are monitored in parallel to collect or determine the usage rate for every buffer. Since each buffer receives a different clock or time domain, clock domain 320, for example, is identified as the optimum clock in response to the usage rates of buffer 310-318. Less desirable clock or time domains 322-328 are subsequently discarded.

An advantage of using multiple buffers processing in parallel is to determine an optimum timing domain for a particular CES more quickly.

Figure 4:
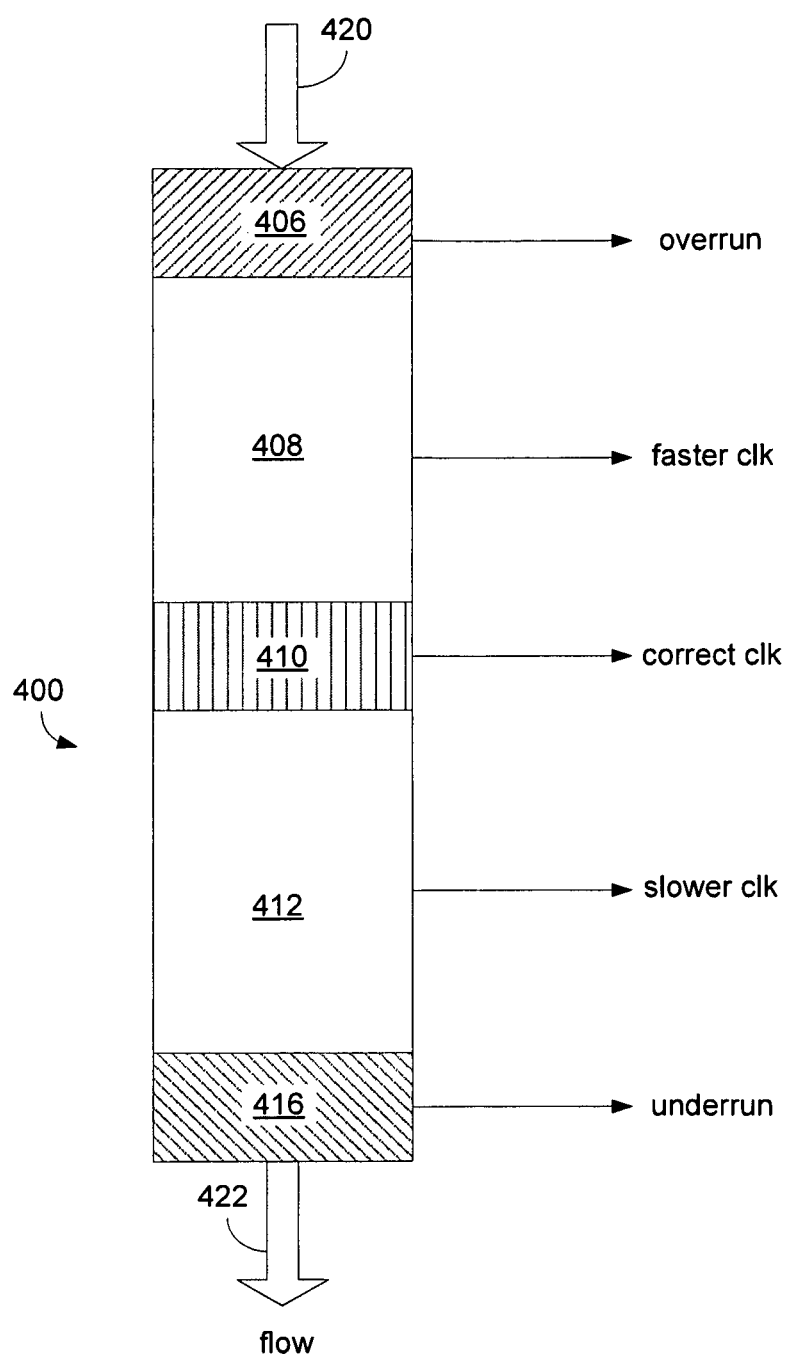
FIG. 4 is a block diagram illustrating a jitter buffer showing buffer usage rate in accordance with one embodiment of the present invention.

FIG. 4 is a block diagram illustrating a jitter buffer 400 showing buffer usage rate in accordance with one embodiment of the present invention. Buffer 400 includes an over-run region 406, a faster clock region 408, a desirable clock region 410, a slower clock region 412, and an under-run region 416. Buffer 400, which can be a jitter buffer or any other types of buffers, receives data streams from bus 420 and outputs data stream through bus 422. It should be noted that the underlying concept of the exemplary embodiment(s) of the present invention would not change if one or more portions were added to or removed from buffer 400.

Desirable clock range 410, in one embodiment, is a correct time domain range because if jitter buffer 400 is filled at a predefined clock range such as fifty percent (50%), it indicates that the rate of data departure is approximately the same as the rate of data arrival. Depending on applications, the predefined clock range, for example, may be set to a range between 35% and 70% of the buffer capacity. Note that the range of desirable clock range 410, in one embodiment, can be adjusted by a network administrator or client. If jitter buffer 400 is filled at faster clock region 408, it indicates that a faster clock domain should be assigned because the speed of data arrival to the buffer is faster than the speed of data departure from the buffer. If jitter buffer 400 is filled at over-run region 406, it indicates that the currently assigned clock domain is too slow and the rate of data arrival is faster than the rate of data departure. When jitter buffer operates in over-run region 406, some packets may be dropped because jitter buffer 400 does not have sufficient storage space to store all incoming packets. As such, a faster clock should be assigned when the clock domain management receives the usage report of an over-run scenario.

On the other hand, if jitter buffer 400 is filled with incoming data at slower clock region 412, it indicates that a slower clock domain should be reassigned because the rate of data departure is faster than the rate of data arrival. If jitter buffer 400 is filled with incoming data at under-run region 416, it indicates that the clock is too fast and the buffer is almost empty, which is an under-run scenario. Depending on the applications, regions 406-416 can be adjusted to meet the application requirements. It should be noted that except running at the predefined desirable clock range, the node or system is not operating at an optimum level.

Jitter buffer is a memory device allocated on a per circuit basis and allows the system to absorb and/or tolerate packet delay variations. Since packet networks are non-deterministic, CES implementations contain jitter buffers to absorb distortions and discrepancies. In a CES service, the CES signal is interworked from CES into packets on ingress to the packet-domain by an edge router. After traversing a packet switching network, the packet traffic is again interworked on the egress edge-router from the packet domain back to the CES.

In an operation of PSN-CES interworking, a packet arrives at a node or edge-router and is subsequently stored in a jitter buffer. A CES stream is generated from the head of the jitter buffer at a fixed CES clock rate. The clock rate used to recreate the CES stream is derived adaptively from the incoming packet stream. A correct clock rate, for example, has been determined or chosen if, for a given circuit, the jitter buffer is maintained at a steady level (e.g. 50% fill) which can be an ideal usage rate. The ideal usage rate, in one embodiment, means that the average packet arrival rate matches with the average CES data departure rate. A steady level of a jitter buffer may also indicate that incoming packet stream and egress CES stream are at the same rates or speed. The steady level of a jitter buffer, which could be any percentage of a usage level, indicates that the incoming and outgoing IWF are at approximately the same frequencies.

Figure 5:
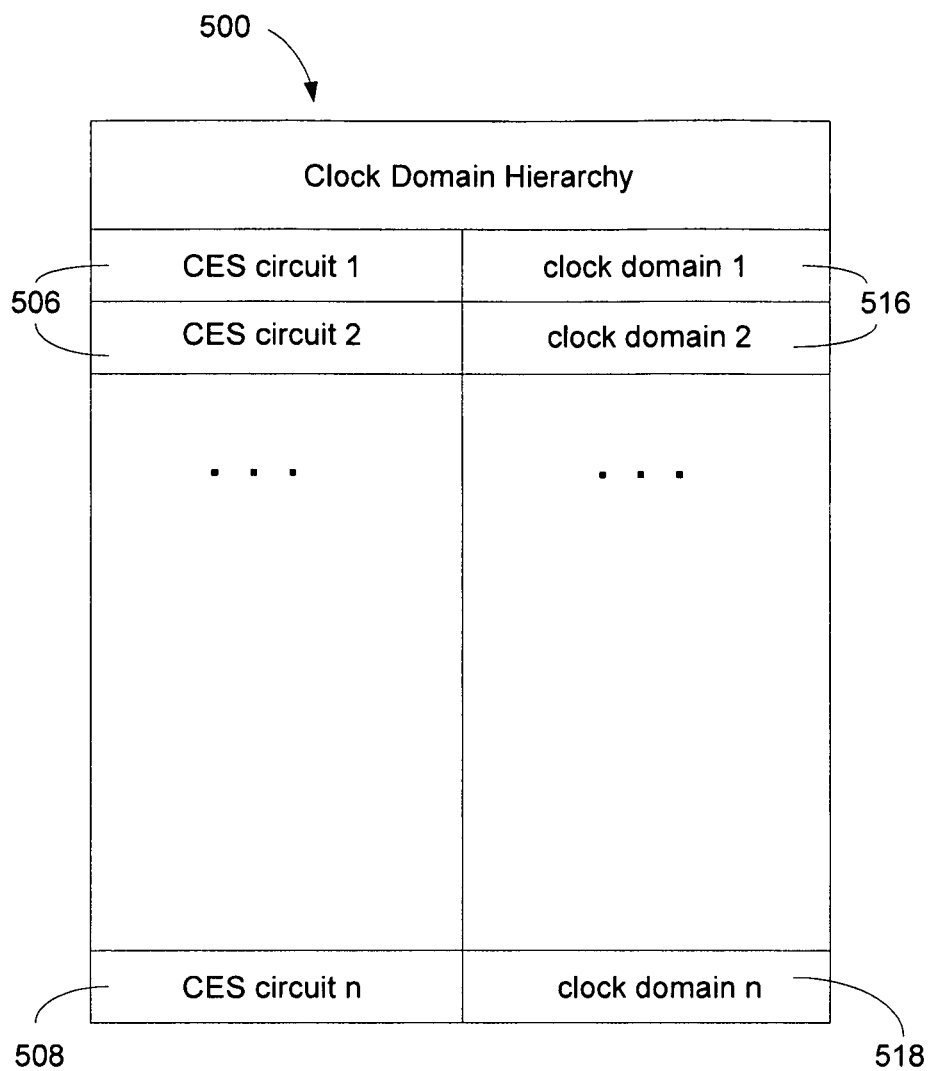
FIG. 5 is a block diagram illustrating a clock domain hierarchy in accordance with one embodiment of the present invention.

FIG. 5 illustrates a clock domain hierarchy 500 in accordance with one embodiment of the present invention. Hierarchy 500, in one embodiment, is part of a network database resided in a node and contains clock domain related information. Hierarchy 500 includes clock domains 516-518 associated with CES circuits 506-508. For example, CES circuit 1 is associated with clock domain 1 while CES circuit 2 is associated with clock domain 2. Clock domain hierarchy 500 can also be referred to as a clock hierarchy, a timing hierarchy, a clock domain database, a timing database, a table, a list, and the like. Clock domain 1 and clock domain 2 may or may not have the same clock frequency. It should be noted that the underlying concept of the exemplary embodiment(s) of the present invention would not change if one or more portions (or entries) were added to or removed from hierarchy 500.

Hierarchy 500, in one embodiment, provides information about what clock domain or optimum clock domain that should be used for a particular CES circuit. For instance, if a node detects a stream of data coming from CES circuit 1, clock domain 1 is fetched and used for subsequent routing of the stream of data. Routing with minimal data loss can be achieved when the rate of data arrival matches with the rate of data departure. The entry(s) of hierarchy 500, in one embodiment, can be dynamically expended or contracted depending on the number of CES circuits detected.

To render assignment of time domains more deterministically, clock domain hierarchy 500 can be used by a node or a system to characterize each timing domain associated with one or more CES circuits. To perform automated clock assignment to a circuit, the node or the system can use the characterization of each clock domain to make an intelligent decision. Hierarchy 500 essentially collects information in connection to relative frequencies of each timing domain based on previously detected usage rate of a jitter buffer and slips recorded in connection to a given CES circuit.

When a circuit moves from one clock domain to another and in search of a correct domain, the system (or node) monitors the jitter buffer levels and number of slips over a sampling period. The clock domain management compares the data from one domain to another, and builds a hierarchy of domains from, for instance, the lowest frequency to the highest frequency. The hierarchy is built and learned over time wherein more and more CES circuits are added to the hierarchy when circuits are added to the system. With each new comparison or characterization, the system's knowledge of the domains is further tuned. After a number of iterations, the system has an ordered list of domains in the hierarchy. To assign a new circuit with a timing domain, the clock domain management or a system can make a calculated choice regarding whether to move to a faster or slower clock domain.

The clock domain management, for example, includes a circuit identifier and a clock selector wherein the circuit identifier is capable of identifying an incoming packet(s) traveling from one clock domain to another clock domain via a CES circuit. The circuit identifier is a circuitry configured to looking up or searching for a clock frequency associated with the CES circuit in the clock domain hierarchy. Note that the clock domain hierarchy should contain an optimal clock frequency for processing the incoming packet if the CES circuit has already been identified and stored (or recorded). The clock selector subsequently assigns the optimal clock frequency to a packet processing unit for processing the incoming packet. The circuit identifier, however, selects one trial clock domain from a pool of clock domains to the packet processing unit for processing the incoming packet when the clock domain hierarchy does not contain the optimal clock frequency.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 6:
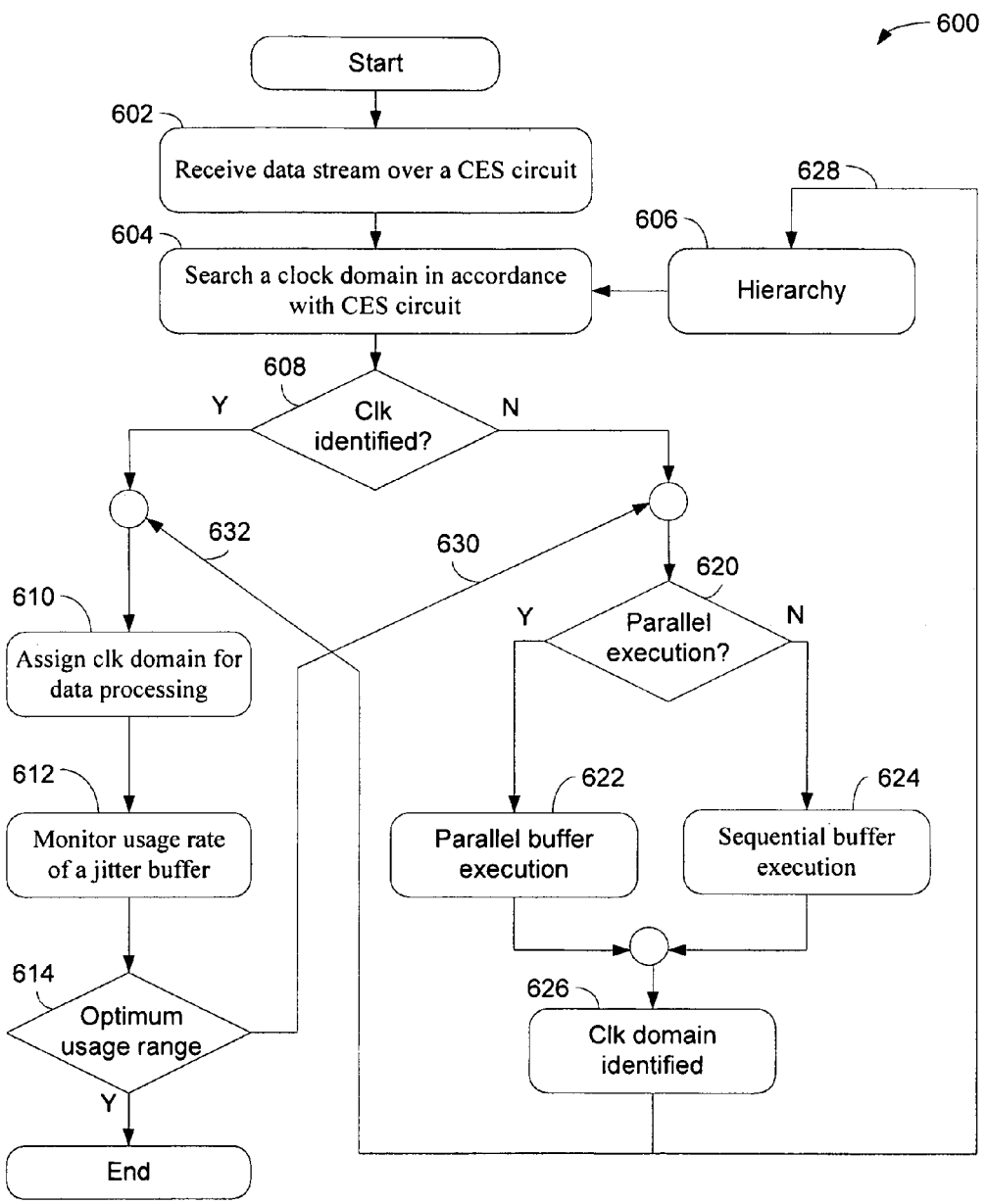
FIG. 6 is a flowchart illustrating a process of recovering reference clock domain using a hierarchy in accordance with one embodiment of the present invention.

FIG. 6 is a flowchart 600 illustrating a process of recovering reference clock domain using a hierarchy in accordance with one embodiment of the present invention. At block 602, a process of clock domain management receives a data stream over a CES circuit. Upon obtaining a clock domain hierarchy, the process, at block 604, searches through the hierarchy provided by block 606 in accordance with the CES circuit. At block 608, the process proceeds to block 610 when a corresponding clock domain or optimum clock domain is found in the clock domain hierarchy.

At block 610, after fetching the corresponding clock domain from the hierarchy, the clock domain is assigned to a packet processing unit for packet routing and/or data processing. The jitter buffer, at block 612, is monitored to determine whether the usage rate of the jitter buffer is within the optimum usage range. At block 614, the process loops to block 620 as indicated by arrow 630 if the optimum usage rate of the jitter buffer is failed to obtain. Otherwise, the process ends.

If a corresponding clock domain fails to find in the clock domain hierarchy at block 608, the process moves to block 620 to determine whether a parallel buffer execution is available at the node. Parallel buffer execution, as illustrated in diagram 300 in FIG. 3, is able to replicate input data steam into multiple replicated data streams stored in multiple jitter buffers whereby an optimum clock domain may be recovered quickly. If the parallel buffer execution is available, the process proceeds to block 622 to identify an optimum clock domain for the CES circuit. Alternatively, the process proceeds to block 624 using a sequential buffer execution which tries one clock domain at a given time until an optimum clock domain is identified.

Upon identifying an optimum clock domain at block 626, the clock domain is forwarded to block 610 as indicated by arrow 632 for data processing. In addition, the clock domain is also sent to block 606 as indicated by arrow 628 for clock domain characterization. At block 606, the process stores the optimum clock domain associated with the CES circuit in the hierarchy or clock domain hierarchy. If an entry of the CES circuit is already in the hierarchy, the storage portion of the clock domain associated with the CES circuit is updated in accordance with the new optimum clock domain.

It should be noted that either a sequential or a parallel approach can be used to characterize timing domains. The characterized clock or timing domain is used to build a hierarchy. The information stored in the hierarchy is prepared for future references. For example, when a system or a node detects a known CES circuit, a corresponding clock domain is fetched from the hierarchy for data processing. It should be noted that a parallel timing domain approach capable of concurrently running through all timing domains can also provide relative hierarchy of timing domains.

Figure 7:
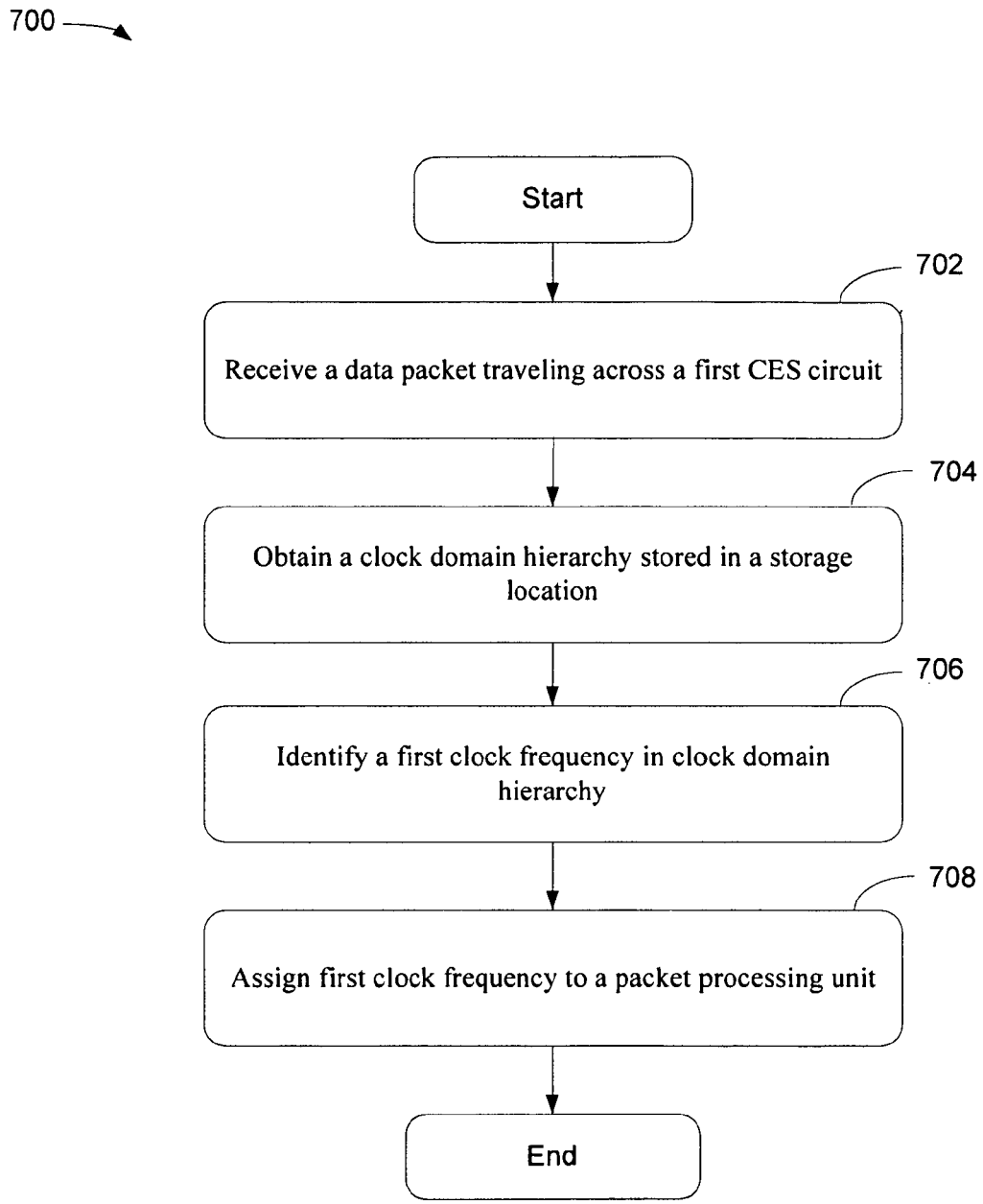
FIG. 7 is a flowchart illustrating a process capable of obtaining a clock domain from a clock domain hierarchy in accordance with one embodiment of the present invention.

FIG. 7 is a flowchart 700 illustrating a process capable of obtaining a clock domain from a clock domain hierarchy in accordance with one embodiment of the present invention. At block 702, a process of clock domain management detects and receives a data packet traveling across a first CES circuit via multiple networks. In one example, the process is capable of obtaining one or more CES data frames traveling between a circuit switching network and a packet switching network.

At block 704, the process obtains a clock domain hierarchy stored in a storage location. For example, a database containing the hierarchy having a table listing clock domains associated with CES circuits is identified and fetched.

At block 706, the process identifies a first clock frequency in the clock domain hierarchy in accordance with the first CES circuit. In one embodiment, the process is configured to search through the table to identify a corresponding clock domain associated with the first CES circuit.

At block 708, the process assigns the first clock frequency to a packet processing unit for data processing. The process, in one embodiment, is further capable of selecting a first trial clock domain to the packet processing unit for processing the data packet when the clock domain hierarchy does not contain the first clock frequency. When the data packet is processed with the first trail clock domain, the usage rate of the jitter buffer is monitored. After dedicating the first trail clock domain to the first clock frequency for the first CES circuit when the usage rate of the jitter buffer falls within a predefined optimum range of buffer usage, the process updates the clock domain hierarchy by inserting the first clock frequency and the first CES circuit. The process is also capable of selecting a second trail clock domain to replace the first trail clock domain when the usage rate of the jitter buffer for the first trail clock domain falls outside of the predefined optimum range of buffer usage. After the data packet is processed utilizing the second trail clock domain, the process monitors the usage rate of the jitter buffer. When the usage rate of jitter buffer falls within a predefined optimum range of jitter buffer usage, the second trail clock domain is dedicated to the first clock frequency associated with the first CES circuit. The process subsequently updates the clock domain hierarchy by inserting information relating to the first clock frequency and the first CES circuit.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for clock domain management, comprising:
   receiving a first data packet traveling across a first circuit emulation service ("CES") circuit;
   obtaining a clock domain hierarchy having a CES section listing a plurality of CES circuits and a clock section containing a list of multiple unique clock frequencies from a storage location;
   comparing the first CES circuit with circuits listed in the CES section until a match is found;
   identifying a first clock frequency associated with a circuit that matches with the first CES circuit in the clock domain hierarchy; and
   assigning the first clock frequency to a packet processing unit for processing the first data packet.

2. The method of claim 1, further comprising selecting a first trial clock domain to the packet processing unit for processing the data packet when the clock domain hierarchy does not contain the first clock frequency.

3. The method of claim 2, further comprising:
   processing the data packet stored in a jitter buffer utilizing the first trial clock domain; and
   monitoring usage rate of the jitter buffer.

4. The method of claim 3, further comprising:
   dedicating the first trial clock domain to the first clock frequency for the first CES circuit when the usage rate of the jitter buffer falls within a predefined optimum range of buffer usage; and
   updating the clock domain hierarchy by inserting information relating to the first clock frequency and the first CES circuit.

5. The method of claim 3, further comprising:
   selecting a second trial clock domain to replace the first trial clock domain when the usage rate of the jitter buffer for the first trial clock domain falls outside of a predefined optimum range of buffer usage;
   processing the data packet stored in the jitter buffer utilizing the second trial clock domain; and
   monitoring the usage rate of the jitter buffer for the second trial clock domain.

6. The method of claim 5, further comprising:
   dedicating the second trial clock domain to the first clock frequency for the first CES circuit when the usage rate of the jitter buffer falls within a predefined optimum range of jitter buffer usage; and
   updating the clock domain hierarchy by inserting information relating to the first clock frequency and the first CES circuit.

7. The method of claim 1, wherein receiving a first data packet traveling across a first CES circuit includes obtaining one or more CES data frames traveling between a circuit switching network and a packet switching network.

8. The method of claim 1, wherein obtaining a clock domain hierarchy includes fetching a database having a table listing a plurality of clock domains associated with the plurality of CES circuits.

9. The method of claim 8, wherein identifying a first clock frequency further includes searching through the table to identify a corresponding clock domain associated with the first CES circuit.

10. A method for providing a clock domain, comprising:
    receiving a packet stream traveling across a first circuit emulation service ("CES") circuit and storing at least a portion of the packet stream in a jitter buffer;
    comparing the first CES circuit with each of a plurality of known CES circuits listed in a CES column of a clock domain hierarchy to determine whether the first CES circuit is listed in the clock domain hierarchy and identifying a first clock domain associated with the first CES circuit from a clock column of the clock domain hierarchy if one of the plurality of known CES circuits matches with the first CES circuit;
    fetching the first clock domain from a clock domain hierarchy in a storage location in accordance with the first CES;
    recovering a first clock domain in response to the data packet and the jitter buffer when the first CES circuit is not found in the plurality of known CES circuits of the clock domain hierarchy; and
    updating the clock domain hierarchy in accordance with recovered clock domain associated with the first CES circuit for future references.

11. The method of claim 10, further comprising processing at least the portion of the packet stream stored in the jitter buffer utilizing the first clock domain.

12. The method of claim 10, wherein fetching the first clock domain from a clock domain hierarchy further includes:
    obtaining the clock domain hierarchy from a storage location; and
    searching the first clock domain in the clock domain hierarchy in accordance with the first CES circuit.

13. The method of claim 10, wherein recovering a first clock domain in response to the data packet includes:
    selecting a first trial clock domain to process the packet stream; and
    monitoring buffer usage of the jitter buffer.

14. The method of claim 13, further includes replacing the first trial clock domain with a second trial clock domain in response to the buffer usage of the jitter buffer.

15. The method of claim 10, wherein recovering a first clock domain in response to the data packet and a jitter buffer further includes replicating the packet stream into a plurality of replicated packet streams.

16. The method of claim 15, further includes forwarding the plurality of replicated packet streams to a plurality of jitter buffers.

17. A method for providing a clock domain comprising:
receiving a packet stream traveling across a first circuit emulation service ("CES") circuit and storing at least a portion of the packet stream in a jitter buffer;
fetching a first clock domain from a clock domain hierarchy in accordance with the first CES circuit when the first clock domain is found in the clock domain hierarchy;
recovering a first clock domain in response to the data packet and the jitter buffer when the clock domain hierarchy does not contain the first clock domain, wherein recovering a first clock domain further includes,
replicating the packet stream into a plurality of replicated packet streams;
forwarding the plurality of replicated packet streams to a plurality of jitter buffers;
applying a unique clock domain to each of the plurality of jitter buffers for data processing;
monitoring usage rates of the plurality of jitter buffers when the jitter buffers are running in parallel; and
identifying a clock frequency having a usage rate fall within a predefined optimum range of usage rate; and
updating the clock domain hierarchy for future references.

18. The method of claim 10, wherein updating the clock domain hierarchy includes:
dedicating a clock frequency to the first clock domain for the first CES circuit when the usage rate of the jitter buffer falls within a predefined optimum range of buffer usage; and
updating the clock domain hierarchy by inserting information relating to the first clock frequency and the first CES circuit.

19. A network system, comprising:
a network database residing in a node and configured to contain a clock domain hierarchy, wherein the clock domain hierarchy includes a circuit emulation service ("CES") column listing a plurality of known CES circuits and a clock column containing a plurality of clock domains have multiple different clock frequencies; and
a clock domain management device configured to compare a first CES circuit with the CES circuits listed in the CES column until a match is found in response to a data packet traveling across the first CES circuit;
wherein the clock domain management device includes:
a circuit identifier coupled to the network database and configured to look up a first clock frequency associated with a circuit that matches with the first CES circuit in the clock domain; and
a clock selector coupled to the circuit identifier and configured to assign the first clock frequency to a packet processing unit for processing the data packet.

20. The system of claim 19, wherein the circuit identifier is further configured to select a first trial clock domain to the packet processing unit for processing the data packet when the clock domain hierarchy does not contain the first clock frequency.

\* \* \* \* \*